United States Patent [19]
Fujioka et al.

[11] Patent Number: 5,525,425
[45] Date of Patent: Jun. 11, 1996

[54] HEAT CURABLE SILICONE ELASTOMER COMPOSITIONS

[75] Inventors: Kazutoshi Fujioka; Takeo Yoshida, both of Gunma-ken, Japan

[73] Assignee: Shin-Etsu Chemical Co., Ltd., Tokyo, Japan

[21] Appl. No.: 325,018

[22] Filed: Oct. 19, 1994

[30] Foreign Application Priority Data

Oct. 19, 1993 [JP] Japan ................................. 5-284339

[51] Int. Cl.⁶ .............................. B32B 27/28; C08K 9/10; C08L 83/04; C08G 77/00
[52] U.S. Cl. ..................... 428/405; 523/211; 524/588; 524/862; 525/478
[58] Field of Search ......................... 523/211; 525/478; 524/588, 862; 428/405

[56] References Cited

U.S. PATENT DOCUMENTS

| | | | |
|---|---|---|---|
| 4,481,341 | 11/1984 | Schlak et al. | 525/478 |
| 4,784,879 | 11/1988 | Lee et al. | 427/213.34 |
| 5,066,699 | 11/1991 | Lee et al. | 528/20 |
| 5,194,460 | 3/1993 | Evans et al. | 523/211 |

FOREIGN PATENT DOCUMENTS 4-46962  2/1992  Japan.

OTHER PUBLICATIONS

Abstract of JP 4-46962.
Abstract of JP-B No. 41707/1978.

*Primary Examiner*—John C. Bleutge
*Assistant Examiner*—Karen A. Dean
*Attorney, Agent, or Firm*—Millen, White, Zelano & Branigan

[57] ABSTRACT

A heat curable silicone elastomer composition includes (1) an organopolysiloxane having at least two aliphatic unsaturated hydrocarbon groups, (2) an organohydrogenpolysiloxane having at least two hydrogen atoms, and (3) a platinum-containing silicone resin having a melting or softening point of 49° to 150° C. and containing 0.05–0.3 mol % of SiOH group. The composition is storage stable at room temperature and efficiently cures through hydrosilylation reaction at high temperature.

18 Claims, No Drawings

HEAT CURABLE SILICONE ELASTOMER COMPOSITIONS

BACKGROUND OF THE INVENTION

1. Field of the Invention

This invention relates to a heat curable silicone elastomer composition of the hydrosilylation reaction curing type which has improved storage stability at approximately room temperature and effectively cures at high temperature.

2. Prior Art

Heat curable silicone elastomer compositions which cure through hydrosilylation reaction are characterized by a substantially reduced time for completion of the curing reaction and by elimination of reaction by-products. They are often used as potting materials, coating materials, adhesives and liquid injection molding materials.

However, heat curable silicone elastomer compositions are unstable during storage at approximately room temperature and thus it is required to divide the composition into two parts for storage and to combine them together on use.

One solution to this problem is to add to silicone elastomer compositions compounds capable of primarily controlling the hydrosilylation reaction, for example, nitrile compounds, carboxylates, metal compounds such as stannous and mercuric compounds, sulfur compounds, benzotriazole, acetylene compounds, hydroperoxide, and phosphorus compounds. Undesirably, when these compounds are used for providing long-term storage stability, they substantially retard curing of the compositions, which then take a longer time for curing to complete.

It was also proposed for such silicone elastomer compositions to physically entrap the catalyst in a substance which is solid at near room temperature and liquid at high temperature. For example, Japanese Patent Publication (JP-B) No. 41707/1978 describes a method for adding a platinum catalyst entrapped in a silicone resin having a softening point to a silicone elastomer composition. However, the inventors found that this method has the drawback that since a silanol group contained in the silicone resin gives rise to a dehydrogenation reaction with a hydrogen atom attached to a silicon atom, curing behavior is exacerbated although the composition is extended in storage stability.

There is a desire to improve the storage stability of a heat curable silicone elastomer composition which cures through hydrosilylation reaction, without sacrificing curability.

SUMMARY OF THE INVENTION

Therefore, an object of the invention is to provide a heat curable silicone elastomer composition of the hydrosilylation reaction curing type which has improved storage stability at approximately room temperature, for example, at around 25° C., and effectively cures at high temperature.

In connection with a heat curable silicone elastomer composition comprising an organopolysiloxane having at least two aliphatic unsaturated hydrocarbon groups each attached to a silicon atom in a molecule, an organohydrogenpolysiloxane having at least two hydrogen atoms each attached to a silicon atom in a molecule, and optionally, a hydrosilylation reaction control agent, the inventors have found that when a platinum-containing thermoplastic silicone resin having a melting or softening point of 40° to 150° C. and a limited content of SiOH group is blended in the composition as a hydrosilylation reaction catalyst, dehydrogenation reaction between a silanol group in the silicone resin and a hydrogen atom attached to a silicon atom is suppressed and therefore, storage stability at approximately room temperature is well maintained while curing behavior at high temperature is significantly improved.

Therefore the present invention provides a heat curable silicone elastomer composition comprising (1) an organopolysiloxane having at least two aliphatic unsaturated hydrocarbon groups each bonded to a silicon atom in a molecule, (2) an organohydrogenpolysiloxane having at least two hydrogen atoms each bonded to a silicon atom in a molecule, and (3) a platinum-containing thermoplastic silicone resin having a melting or softening point of 40° to 150° C. and containing up to 0.3 mol % of SiOH group in the resin.

DETAILED DESCRIPTION OF THE INVENTION

The first or base component of the heat curable silicone elastomer composition of the invention is an organopolysiloxane having at least two, preferably 2 to 10 aliphatic unsaturated monovalent hydrocarbon groups each bonded to a silicon atom in a molecule. It may be selected from organopolysiloxanes well known for conventional heat curable silicone elastomer compositions.

The organopolysiloxane preferably has the following average compositional formula (1):

$$R_a^1 SiO_{(4-a)/2} \tag{1}$$

wherein $R^1$ represents substituted or unsubstituted monovalent hydrocarbon groups, which may be identical or different, having 1 to 10 carbon atoms and letter a is a positive number of 1.80 to 2.20, preferably 1.85 to 2.10.

Examples of the monovalent hydrocarbon groups include alkyl groups such as methyl, ethyl, propyl, isopropyl, butyl, iso-butyl, tert-butyl, pentyl, neopentyl, hexyl, cyclohexyl, octyl, nonyl and decyl, aryl groups such as phenyl, tolyl, xylyl and naphthyl, aralkyl groups such as benzyl, phenylethyl and phenylpropyl, alkenyl groups such as vinyl, allyl, propenyl, isopropenyl, butenyl, isobutenyl, hexenyl, cyclohexenyl and octenyl, and substituted ones of these groups wherein some or all of the hydrogen atoms are replaced by halogen atoms, for example, fluorine, bromine and chlorine, or cyano groups, such as chloromethyl, chloropropyl, bromoethyl, trifluoropropyl and cyanoethyl groups.

The organopolysiloxane generally has a straight chain structure basically composed of the repeated diorganosiloxane units and having triorganosiloxane units at both ends although it may partially contain a branched or cyclic skeleton.

The organopolysiloxane should have at least two, preferably 2 to 10 aliphatic unsaturated monovalent hydrocarbon groups including an alkenyl group preferably having 2 to 8 carbon atoms, more preferably having 2 to 6 carbon atoms. The aliphatic unsaturated hydrocarbon groups may be bonded to silicon atoms at the terminals or internally in the chain, although the organopolysiloxane has at least one aliphatic unsaturated monovalent hydrocarbon group bonded to a silicon atom at one terminal of the chain from the viewpoint of the curing rate of the composition and the properties of the cured product.

The degree of polymerization, i.e. the number of silicon atoms in the molecule is generally 20 or higher, preferably 20 to 3000, more preferably 200 to 1500.

A second component of the inventive composition is an organohydrogenpolysiloxane having at least two, preferably 2 to 100, more preferably 3 to 50 hydrogen atoms each bonded to a silicon atom in a molecule, which serves as a crosslinking agent for the first component or organopolysiloxane. It may be selected from organohydrogenpolysiloxanes well known for conventional heat curable silicone elastomer compositions.

The organohydrogenpolysiloxane preferably has the following average compositional formula (2):

$$R_b^2(H)_c SiO_{(4-b-c)/2} \qquad (2)$$

wherein $R^2$ represents substituted or unsubstituted monovalent hydrocarbon groups, which may be identical or different, having 1 to 10, preferably 1 to 8 carbon atoms, and letters b and c are positive numbers satisfying the following ranges: $1.6 \leq b \leq 2.2$, $0.002 \leq c \leq 1.0$ and $1.6 < b+c \leq 3.0$ The monovalent hydrocarbon groups preferably do not have aliphatic unsaturated bonds. Examples of the monovalent hydrocarbon groups include alkyl groups such as methyl, ethyl, propyl, isopropyl, butyl, iso-butyl, tert-butyl, pentyl, neopentyl, hexyl, cyclohexyl, octyl, nonyl and decyl, aryl groups such as phenyl, tolyl, xylyl and naphthyl, aralkyl groups such as benzyl, phenylethyl and phenylpropyl, alkenyl groups such as vinyl, allyl, propenyl, isopropenyl, butenyl, isobutenyl, hexenyl, cyclohexenyl and octenyl, and substituted ones of these groups wherein some or all of the hydrogen atoms are replaced by halogen atoms, for example, fluorine, bromine and chlorine, or cyano groups, such as chloromethyl, chloropropyl, bromoethyl, trifluoropropyl and cyanoethyl groups.

The organopolysiloxane generally has a straight chain structure basically composed of the repeated difunctional siloxane units ($\equiv SiO_{2/2}$) and having monofunctional siloxane units ($\equiv SiO_{1/2}$) at both ends although it may be a branched or three-dimensional network structure.

The hydrogen atoms directly bonded to silicon atoms (SiH groups) may be bonded to silicon atoms at the terminals or internally in the chain.

The degree of polymerization, i.e. the number of silicon atoms in the molecule is preferably in the range of 3 to 300.

Preferably the second component or organohydrogenpolysiloxane is blended in such amounts that the molar ratio of a hydrogen atom attached to a silicon atom in the molecule of the organohydrogenpolysiloxane to an unsaturated hydrocarbon group attached to a silicon atom in the molecule of the organopolysiloxane as the first component may range from 10:1 to 1:10, especially from 3:1 to 1:3.

According to the invention, a thermo-plastic silicone resin containing platinum or a platinum compound, having a melting or softening point of 40° to 150° C. and containing up to 0.3 mol %, preferably 0.05 to 0.2 mol %, of SiOH group in the resin is blended as a third component. The platinum or platinum compound in the silicone resin is a catalyst for effecting hydrosilylation reaction between an aliphatic unsaturated hydrocarbon group attached to a silicon atom in the organopolysiloxane molecule as the first component and a hydrogen atom attached to a silicon atom in the organohydrogenpolysiloxane molecule as the second component, for crosslinking.

Preferably the silicone resin used herein is one having the following formula (3).

$$R_n SiO_{(4-n)/2} \qquad (3)$$

In formula (3), R is a substituted or unsubstituted monovalent hydrocarbon group having 1 to 10, preferably 1 to 8 carbon atoms, particularly except for aliphatic unsaturated groups, for example, an alkyl group such as methyl, ethyl, propyl, isopropyl, butyl isobutyl, tert-butyl, pentyl, neopentyl, hexyl, cyclohexyl, octyl, nonyl and decyl, alkenyl groups such as vinyl, allyl, propenyl, isopropenyl, butenyl, isobutenyl, hexenyl and cyclohexenyl, aryl groups such as phenyl, tolyl, xylyl and naphthyl, aralkyl groups such as benzyl, phenylethyl and phenylpropyl and substituted ones of these organic groups wherein some or all of the hydrogen atoms thereof are replaced by halogen atoms, for example, fluorine, bromine, chlorine or cyano groups, such as chloromethyl, chloropropyl, bromoethyl, trifluoropropyl, and cyanoethyl groups. Preferably phenyl groups constitute more than 50 mol % of R. Letter n is a number having a value of 1 to 1.8, preferably of 1 to 1.5.

The silicone resin has a melting or softening point of 40° to 150° C., preferably 60° to 130° C. A silicone resin having a melting or softening point of lower than 40° C. allows the catalyst component to ooze out during storage of the composition, failing to maintain storage stability. A silicone resin having a melting or softening point of higher than 150° C. does not effectively and quickly melt or soften upon heat curing and does not allow the catalyst component to ooze out, retarding the curing step.

Further the silicone resin should contain up to 0.3 mol %, generally 0.01 to 0.3 mol %, preferably 0.05 to 0.2 mol %, of SiOH group therein. If the SiOH group content exceeds 0.3 mol %, it becomes impossible to suppress dehydrogenation reaction between a silanol group in the silicone resin and a hydrogen atom attached to a silicon atom in the second component or organohydrogenpolysiloxane.

The silicone resin of formula (3) can be readily prepared, for example, by hydrolyzing a mixture represented by the equation $R_n SiX_{4-n}$ (R and n being defined as above) which is obtained by the mixing of organic silicon compounds of the following formula (4) and then silylating a SiOH group in the resin with a silylating agent.

$$R_m SiX_{4-m} \qquad (4)$$

In formula (4), R is as defined above. Letter m is 0, 1, 2 or 3. X is a monovalent hydrolyzable group, for example, halogen atoms such as chlorine atom and bromine atom, alkoxy groups such as methoxy, ethoxy, propoxy, butoxy, methoxyethoxy and ethoxyethoxy, alkenyloxy groups such as allyloxy, propenyloxy and isopropenyloxy, acyloxy groups such as acetoxy and propionyloxy, amino groups such as dimethylamino, diethylamino, methylethylamino and butylamino, and amido groups such as dimethylacetamido, with the chlorine atom and methoxy group being preferred.

Hydrolysis of the mixture of the organic silicon compound of formula (4) can be effected in a conventional manner using acid and basic catalysts. Exemplary acid catalysts include sulfuric acid, hydrochloric acid, methanesulfonic acid, and trifluoromethanesulfonic acid and exemplary basic catalysts include sodium hydroxide, potassium hydroxide, and lithium hydroxide. Such catalysts are desirably added in amounts of about 0.1 to 2% by weight.

Subsequent silylation is effected such that the SiOH group content in the resin may be reduced to 0.3 mol % or lower. Examples of the silylating agent include hexamethyldisilazane, trimethylfluorosilane, N,O-bis(trimethylsilyl)-acetamide, and N-trimethylsilyl-acetamide. Using such a silylating agent in an amount of 1 to 5 mol per equivalent of SiOH group in the resin, silylation is desirably effected at 25° to 100° C. for about 1 to 3 hours.

Examples of the platinum compound contained in the silicone resin include chloroplatinic acid, platinum sulfide, sodium chloroplatinate, alcohol compounds of chloroplatinic acid, and complexes of platinum with olefinic compounds, which may or may not be supported on inorganic compounds such as silica, carbon black, alumina, and titanium oxide. Among others, complexes of platinum with divinylsiloxanes are preferred because of high catalytic activity. Preferably the platinum or platinum compound is contained in the silicone resin in an amount of up to 50 parts by weight, especially 0.01 to 10 parts by weight per 100 parts by weight of the silicone resin. More than 50 parts of platinum would be difficult to entrap in the resin and hence, can deteriorate the storage stability of the composition.

Platinum or platinum compound is introduced into the silicone resin in a simple manner, for example, by dissolving the silicone resin in an organic solvent such as dichloromethane (chlorinated solvent), toluene (hydrocarbon solvent), acetone and hexane, adding platinum or platinum compound to the solution, mixing them, and ripening the solution overnight.

Desirably, the platinum or platinum compound-containing silicone resin is used in the form of fine particles. To this end, the silicone resin solution which has been admixed with platinum or platinum compound is typically spray dried, obtaining fine particles of the resin. Preferably the fine particles have a mean particle size of about 1 to 100 μm, particularly of about 1 to 50 μm.

In the inventive composition, the platinum or platinum compound-containing silicone resin is preferably blended in such amounts that there may be present 0.1 to 500 ppm, especially 1 to 50 ppm of platinum (parts by weight of Pt per million parts by weight of the composition). With less than 0.1 ppm of Pt, the composition would be less curable. More than 500 ppm of Pt would adversely affect the storage stability of the composition. Alternatively, the platinum or platinum compound-containing silicone resin is preferably blended in such amounts that there may be present 0.1 to 1000 ppm, preferably 1 to 100 ppm of platinum (parts by weight of Pt per million parts by weight of the first component).

In the practice of the invention, a hydrosilylation reaction control agent is preferably blended in the composition as a fourth component. The agent can delay the time of starting curing at high temperature, thus, increasing the pot life and improving moldability. The hydrosilylation reaction control agent may be selected from conventional well-known ones, for example, nitrogenous compounds such as tetramethylenediamine and benzotriazole, acetylene compounds such as propargyl alcohol, hydroperoxide, phosphorus compounds such as triphenylphosphine, nitrile compounds, carboxylates, metal compounds such as stannous and mercuric compounds, and sulfur compounds, with the acetylene compounds being preferred. The hydrosilylation reaction control agent is desirably blended in amounts of 0 to 1 part by weight per 100 parts by weight of the first component or organopolysiloxane.

In addition to the above-mentioned components, the inventive composition may further contain fillers such as silica fine particles and calcium carbonate, heat resistant agents such as iron oxide, flame retardants such as carbon black, tackifiers, and thixotropic agents, if desired.

EXAMPLE

Examples of the invention are given below by way of illustration and not by way of limitation. All parts are by weight.

Preparation of Silicone Resin Containing Platinum Catalyst

A glass container was charged with 70 mol % of phenyltrichlorosilane, 25 mol % of methyltrichlorosilane and 5 mol % of diphenyldichlorosilane, which were hydrolyzed. 10 parts of hexamethyldisilazane was added thereto and sylation was effected at 70° C. for 2 hours. The volatiles were distilled off under vacuum, leaving a silicone resin having a softening point of 83° C., and substantially represented by $[C_6H_5SiO_{3/2}]_{0.70}[CH_3SiO_{3/2}]_{0.25}[(C_6H_5)_2SiO_{2/2}]_{0.05}$ and containing 0.1 mol % of SiOH group. This silicone resin, 100 grams, was dissolved in 500 grams of dichloromethane. The silicone resin solution was then mixed with 25 grams of a toluene solution of a platinum complex which had been obtained by neutralizing chloroplatinic acid and tetramethyldivinyldisiloxane with sodium hydrogen carbonate (platinum content 2% by weight) and ripened overnight. The solution was atomized through a spray dryer (inlet temperature 90° C., outlet temperature 40° C.), obtaining 60 grams of silicone resin fine particles having a mean particle size of 7 μm and a platinum content of 0.5% by weight, which is designated fine particulate catalyst A.

For comparison purposes, the above-mentioned procedure was repeated except that a silicone resin having a softening point of 90° C. and substantially represented by $[C_6H_5SiO_{3/2}]_{0.70}[CH_3SiO_{3/2}]_{0.25}[(C_6H_5)_2SiO_{2/2}]_{0.05}$ and containing 0.4 mol % of SiOH group prior to silylation with hexamethyldisilazane was used as the silicone resin. There were obtained 60 grams of silicone resin fine particles having a mean particle size of 8 μm and a platinum content of 0.5% by weight, which is designated fine particulate catalyst B.

Example 1 & Comparative Example 1

A base compound was prepared by mixing 500 grams of α, ω-divinyldimethylpolysiloxane having a viscosity of 10,000 centistokes with 150 grams of fumed silica having a specific surface area of 150 m²/g which had been treated with hexamethyldisilazane for rendering the surface hydrophobic. To 100 grams of the base compound was added 2.0 grams of a methylhydrogenpolysiloxane of the following formula.

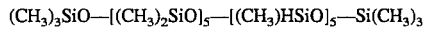

$(CH_3)_3SiO—[(CH_3)_2SiO]_5—[(CH_3)HSiO]_5—Si(CH_3)_3$

To the mixture were further added 0.2 gram of silicone resin fine particulate catalyst A and 0.05 gram of ethynylhexalol. The mixture was homogeneously mixed and milled in a three roll mill, obtaining a silicone elastomer composition 1 (Example 1).

For comparison purpose, a silicone elastomer composition 2 was obtained by repeating the same procedure as in Example 1 except that silicone resin fine particulate catalyst B was used instead of silicone resin fine particulate catalyst A (Comparative Example 1).

Each of the silicone elastomer compositions was examined for curing at 150° C. using a rheometer. T10 is a time taken until the torque reaches 10% of the maximum. T90 is a time taken until the torque reaches 90% of the maximum.

Each silicone elastomer composition was placed in a container which was sealed and kept at 40° C. The composition was measured for plasticity at intervals. The pot life is a time passed until the composition loses plasticity.

The results are shown in Table 1.

TABLE 1

|  | Composition 1 | Composition 2 |
|---|---|---|
| T10 (sec.) | 25 | 28 |
| T90 (sec.) | 36 | 90 |
| Pot life (day) | 15 | 15 |

For both the compositions, the pot life was 15 days, indicating good storage stability. However, as compared with composition 1, composition 2 showed slow curing at 150° C., especially in terms of T90.

Example 2 & Comparative Example 2

A base compound was prepared by mixing 500 grams of a methylvinylpolysiloxane of the following formula:

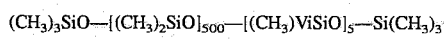

$(CH_3)_3SiO-[(CH_3)_2SiO]_{500}-[(CH_3)ViSiO]_5-Si(CH_3)_3$ wherein Vi is vinyl with 200 grams of precipitated silica having a specific surface area of 400 m²/g and 20 grams of acetylene black having a specific surface area of 500 m²/g and heat treating the mixture at 150° C. for 2 hours. To 100 grams of the base compound was added 5.0 grams of a methylhydrogenpolysiloxane of the following formula.

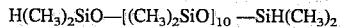

$H(CH_3)_2SiO-[(CH_3)_2SiO]_{10}-SiH(CH_3)_2$

To the mixture were further added 0.3 gram of silicone resin fine particulate catalyst A, 0.06 gram of ethynylhexalol, and 2.5 grams of heptane. The mixture was homogeneously mixed and milled in a three roll mill, obtaining a silicone elastomer composition 3 (Example 2).

For comparison purposes, a silicone elastomer composition 4 was obtained by repeating the same procedure as in Example 2 except that silicone resin fine particulate catalyst B was used instead of silicone resin fine particulate catalyst A (Comparative Example 2).

Each of the silicone elastomer compositions was examined for curing at 150° C. and pot life.

The results are shown in Table 2.

TABLE 2

|  | Composition 3 | Composition 4 |
|---|---|---|
| T10 (sec.) | 18 | 20 |
| T90 (sec.) | 28 | 69 |
| Pot life (day) | 10 | 10 |

For both the compositions, the pot life was 10 days, indicating good storage stability. However, as compared with composition 3, composition 4 showed slow curing at 150° C., especially in terms of T90.

There has been described a heat curable silicone elastomer composition which can be shelf stored at about room temperature in a stable manner and efficiently cured at high temperature. The composition finds application in a wide variety of areas as potting material, coating material, adhesive and liquid injection molding material.

Japanese Patent Application No. 5-284339 is incorporated herein by reference.

Although some preferred embodiments have been described, many modifications and variations may be made thereto in the light of the above teachings. It is therefore to be understood that within the scope of the appended claims, the invention may be practiced otherwise than as specifically described.

We claim:

1. A heat curable silicone elastomer composition comprising
   (1) an organopolysiloxane having at least two aliphatic unsaturated hydrocarbon groups each bonded to a silicon atom in a molecule,
   (2) an organohydrogenpolysiloxane having at least two hydrogen atoms each bonded to a silicon atom in a molecule, and
   (3) a thermoplastic silicone resin having the following formula:

$R_nSiO_{(4-n)/2}$ wherein R is a halogen- or cyano-substituted or unsubstituted monovalent hydrocarbon group and n is a number from 1–1.8, containing platinum or a platinum compound, having a melting or softening point of 40° to 150° C. and containing SiOH groups in the resin in an amount of 0.01 to 0.3 mol %,
   said silicone resin being prepared by hydrolyzing a mixture of organic silicon compounds of the following formula:

$R_mSiX_{4-m}$ wherein R is as defined above, letter m is 0, 1, 2 or 3 and X is a monovalent hydrolyzable group or atom to obtain a hydrolysis product, and then silylating at least one SiOH group in the hydrolysis product with a silylating agent.

2. The composition of claim 1 wherein said silicone resin contains up to 50 parts by weight of platinum or a platinum compound per 100 parts by weight of the silicone resin.

3. The composition of claim 1 wherein said silicone resin contains 0.05 to 0.2 mol % of SiOH group.

4. The composition of claim 1 which further includes
   (4) a hydrosilylation reaction control agent.

5. The composition of claim 1, wherein the organopolysiloxane, component (1), has the following compositional formula:

$R_a^1SiO_{(4-a)/2}$, wherein $R^1$ is a halogen- or cyano-substituted or unsubstituted monovalent hydrocarbon group of 1–10 carbon atoms and a is a number from 1.80–2.20.

6. The composition of claim 1, wherein the organopolysiloxane, component (1), has at least one aliphatic unsaturated monovalent hydrocarbon group bonded to a silicon atom at a terminal of the siloxane chain.

7. The composition of claim 1, wherein the organopolysiloxane, component (1), has a degree of polymerization of 20–3000.

8. The composition of claim 1, wherein the organohydrogenpolysiloxane, component (2), has the following compositional formula:

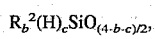

$R_b^2(H)_cSiO_{(4-b-c)/2}$, wherein $R^2$ is a halogen- or cyano-substituted or unsubstituted monovalent hydrocarbon group of 1–10 carbon atoms and the letters b and c are positive numbers satisfying the following equations: $1.6 \leq b \leq 2.2$, $0.002 \leq c \leq 1.0$ and $1.6 \leq b+c \leq 3.0$.

9. The composition of claim 1, wherein the organohydrogenpolysiloxane, component (2), has a degree of polymerization of 3–300.

10. The composition of claim 1, wherein the organopolysiloxane, component (1), and organohydrogenpolysiloxane, component (2), are provided such that the molar ratio of hydrogen atoms attached to silicon atoms in (2) to unsaturated hydrocarbon groups bonded to silicon atoms in (1) is from 10:1 to 1:10.

11. The composition of claim 1, wherein in the thermoplastic silicone resin, component (3), R is a monovalent hydrocarbon group of 1 to 10 carbon atoms.

12. The composition of claim 1, wherein in the thermoplastic silicone resin, component (3), more than 50 mol % of the R groups are phenyl groups.

13. The composition of claim 1, wherein the thermoplastic silicone resin, component (3), has a melting or softening point of 60° to 130° C.

14. The composition of claim 1, wherein the thermoplastic silicone resin, component (3), contains 0.01 to 10 parts by weight of platinum or a platinum compound per 100 parts by weight of the resin.

15. The composition of claim 1, wherein the platinum or a platinum compound is present as particles with a mean particle size of about 1 to 100 μm.

16. The composition of claim 1, wherein the content of SiOH group in the resin of component (3) is 0.05 to 0.3 mol %.

17. The composition of claim 1, wherein the monovalent hydrolyzable groups or atoms in the organic silicon compounds used to prepare component (3) are selected from the group consisting of halogen atoms, alkoxy groups, alkenyloxy groups, acyloxy groups, amino groups, and amido groups.

18. The composition of claim 1, wherein the silylating agent used in preparing component (3) is hexamethyldisilazane, trimethylfluorosilane, N,O-bis(trimethylsilyl)-acetamide or N-trimethylsilylacetamide.

* * * * *